Patented Dec. 8, 1953

2,662,094

UNITED STATES PATENT OFFICE 2,662,094

CHLORALIMINE-N-SULFONATES

Jonas Kamlet, Easton, Conn., assignor to Mathieson Chemical Corporation, a corporation of Virginia No Drawing. Application September 18, 1952, Serial No. 310,370

6 Claims. (Cl. 260—500)

The present invention relates to new compositions of matter, chloralimine-N-sulfonic acid and its water-soluble salts, which are particularly useful as herbicides.

My new compositions of matter comprise chloralimine-N-sulfonic acid. They may be represented by the general formula:

$$CCl_3CH=N \cdot SO_2OM$$

where M is an equivalent of a water-solubilizing cation or a hydrogen atom in the case of the acid. Exemplary of such salts are the ammonium, sodium and potassium salts. The compounds are white crystalline solids, almost completely odorless or faintly smelling of chloral, and are relatively non-volatile. The compounds will not burn nor support combustion. In fact, materials impregnated with solutions of the acid or salts are rendered fire-retardant. In particular, the compounds possess special utility as herbicides such as selective weed killers.

Chloralimine-N-sulfonic acid can be prepared by reacting chloral with sulfamic acid, diluted in warm water, under reflux conditions. The salts may be prepared by neutralizing the acid with a base. The salts can also be formed by reacting chloral with a water-solution salt of sulfamic acid. In each case the proportions of the synthesis reactants are critical to the formation of this group of compounds. In the method employing free sulfamic acid equimolar amounts of chloral, chloral hydrate or chloral alcoholate and sulfamic acid are reacted to form chloralimine-N-sulfonic acid. The acid is then neutralized with an organic or inorganic base to form the salt. Suitable inorganic base compounds for neutralization include caustic soda, lime, soda ash, potassium hydroxide, ammonia, and magnesium hydroxide. Satisfactory organic bases include mono-, di- or tri-alkyl-amines, such as methyl amine, dimethyl amine, trimethyl amine, ethyl amine, diethyl amine, and triethyl amine; mono-, di-, or tri-alkanol amines, such as monoethanolamine, diethanolamine; pyridine, picolines, lutidines, morpholine, ethylene di-amine and the like. The reactions go according to the following equations:

$$CCl_3CHO+NH_2SO_2OH \rightarrow CCl_3CH=NSO_2OH+H_2O$$

$$CCl_3CH=NSO_2OH+MOH \rightarrow CCl_3CH=NSO_2OM+H_2O$$

where M is the equivalent of a water-solubilizing cation. Another method for preparing the salt comprises reacting equimolar amounts of chloral, chloral hydrate or chloral alcoholate and a water-soluble salt of sulfamic acid. By this method the ammonium salt is prepared from chloral as follows:

$$CCl_3CHO+NH_2SO_2ONH_4 \rightarrow$$
$$CCl_3CH=NSO_2ONH_4+H_2O$$

The sodium salt is prepared from chloral hydrate in this way:

$$CCl_3CH(OH)_2+NH_2SO_2ONa \rightarrow$$
$$CCl_3CH=NSO_2ONa+2H_2O$$

The potassium salt is prepared from chloral alcoholate as follows:

$$CCl_3CH\begin{matrix}OH\\ \\OC_2H_5\end{matrix} + NH_2SO_2OK \longrightarrow$$

$$CCl_3CH=NSO_2OK + H_2O + C_2H_5OH$$

As already stated above, the new compositions according to my invention are especially characterized by their utility as herbicides. In this regard, either the acid or the salts find equal value as weed killers. The compounds are inexpensive to use and offer a satisfactory means for selectively killing undesirable vegetation. They are particularly desirable, further, since application may be made without the danger of sterilizing the soil for long periods of time. The salts or acid are translocated in the root and capillaries of the weeds and do not remain too long in the soil before decomposing into harmless and volatile compounds. They are non-corrosive to metallic equipment in which they may be handled. And the compounds are relatively less toxic to humans or domestic animals than are the more volatile derivatives of chloral, tri-chloracetic acid or the salts thereof.

When used as herbicides the compounds are generally applied in the form of a spray or a dust. When used as dusts or in finely divided solid form it is desirable to form blends with an inert diluent, such as finely-divided talc, bentonite, pyrophyllite or calcium carbonate. When the compounds are used as a spray or in aqueous solution, it is advantageous to also employ a wetting agent to insure good contact in the foliage of treated vegetation. Typical satisfactory wetting agents include the alkylaryl sulfonates, the fatty alcohol sulfates, sodium salts of alkyl naphthalene sulfonic acids, long chain quaternary ammonium compounds and sodium salts of petroleum-derived alkylsulfonic acids. The compounds may also be used in conjunction with other weed killers, defoliants or herbicides such as 2,4-dichlorphenoxy acetate salts, 2,4,5-trichlorophenoxy acetate salts, ammonium thiocyanate and sodium arsenite.

The chloralimine-N-sulfonic acid or salts are effective by adsorption through the foliage or root systems. That is, when applied as a spray the compound is adsorbed through the leaves of the plants, followed by migration of the chemical to the roots, killing the entire root system in the process. When the compounds are applied to the soil, they are adsorbed through the roots thereby starving the entire plant. Of course, by application in dry form or from aqueous solution both mechanisms may operate simultaneous to kill the plants. In general, then, the procedures that I have found desirable to follow are those common to all translocated herbicidal agents.

It is believed that the compounds are effective by reason of absorption through the root and capillaries systems of the weed and plant into the individual plant cells, where by metabolic processes the compounds are degraded to phytotoxic derivatives containing the labile $CCl_3$— and —$NH_2SO_2OH$ groups, both of which are powerful plant poisons, the former being a respiratory enzyme toxin and the latter being a strong plant metabolic enzyme toxin.

The following examples illustrate the preparation of my new compositions and the effectiveness of these compounds in destroying vegetation.

*Example I*

970 grams of sulfamic acid were dissolved in 2 liters of water at 80° C. A total of 1480 grams of chloral were added cautiously in small portions while the reaction mixture was being refluxed. On cooling, there was obtained a slurry containing 4.45 kilograms of an approximately 50 per cent suspension of chloralimine-N-sulfonic acid.

*Example II*

970 grams of sulfamic acid were dissolved in two liters of water at 80° C. A total of 1480 grams of chloral were added cautiously in small portions while the reaction mixture was being refluxed. The reaction mixture was cooled and a total of 1500 grams of triethanolamine were added cautiously while maintaining the temperature below 30° C. There was obtained a total of 5.95 kilograms of a syrupy 63 per cent concentrate of the triethanolamine salt of chloralimine-N-sulfonic acid.

*Example III*

970 grams of sulfamic acid were dissolved in four liters of warm water. A total of 1480 grams of chloral were added cautiously in small portions while the reaction mixture was being refluxed. The reaction mixture was cooled and a total of four liters of a 10 per cent sodium hydroxide solution were added cautiously while maintaining the temperature below 30° C. On cooling there was obtained about 10.5 kilograms of an approximately 24 per cent aqueous solution of the sodium salt of chloralimine-N-sulfonic acid.

The weed killing properties of the sodium salt of chloralimine-N-sulfonic acid were tested by spraying a plot of land fifty square feet in area and covered with mixed annual weeds with a 2 per cent solution of sodium chloralimine-N-sulfonic acid at the rate of 200 pounds per acre. In three days all of the weeds in the plot were dead or dying and in six days, complete killing of the weeds was noted.

*Example IV*

1140 grams of ammonium sulfamate were dissolved in two liters of warm water. A total of 1480 grams of chloral were added cautiously in small portions while the reaction mixture was being refluxed. On cooling, there was obtained 4.62 kilograms of 53 per cent solution of the ammonium salt of chloralimine-N-sulfonic acid. The herbicidal properties of this compound are illustrated in the following tests:

Plots of 200 square feet area were selected containing a variety of weeds with poison ivy predominating. Sprays containing 0.5 lb. of ammonium chloralimine-N-sulfonate per gallon were applied at the rate of 1 gallon per 100 square feet. In two days, severe injury to the poison ivy was noted. In 10 days, the poison ivy was completely dead and all of the weeds shrivelled up. None of the weeds reappeared at the end of the season, although there was evidence of a fair growth of grass on the treated area.

A 6 ft. by 6 ft. plot of ground heavily infested with poison ivy was sprayed with a solution of ammonium chloralimine-N-sulfonate at the rate of 200 lbs. per acre (i. e. 2.25 gm. per square foot) applied as a 1 per cent solution using 0.05 per cent of sodium kerylbenzene sulfonate as a wetting agent to facilitate absorption. In two days marked epinasty and shrivelling was noted. In five days the weeds were severely damaged and in eight days they were completely dead. No evidence of reappearance was noted in 30 days.

A 6 ft. by 8 ft. plot of scrub land heavily infested with quackgrass was treated with a solution of ammonium chloralimine-N-sulfonate in the manner described in the preceding paragraph. In two days, marked epinasty and shrivelling was noted. In seven days, the weds were severely damaged and in twelve days they were dead. No evidence of reappearance was noted in 30 days.

Individual stands of corn (4 inches high), millet (6 inches high), wheat (5 inches high), tomatoes (5 inches high) cranberry bean (7 inches high) soybeans (5 inches high) and peach plants (6 inches high) were sprayed to run off with a one per cent solution of ammonium chloralimine-N-sulfonate containing 0.05 per cent of sodium kerylbenzene sulfonate. In two days, the corn, millet, wheat and soybeans were moderately injured whereas the tomato, cranberry and peaches were relatively unaffected. In ten days, the corn, millet and wheat were moderately injured, the soybeans were severely injured, but the tomatoes, cranberries and peaches were unaffected and normal. This serves to illustrate the selective action of the herbicides of the present invention.

This application is a continuation-in-part of my copending application Serial No. 180,911, filed August 22, 1950, and now abandoned.

I claim:

1. Compounds of the general formula:

$$CCl_3CH{=}N.SO_2OM$$

where M is selected from the group consisting of hydrogen and water-solubilizing cations.

2. Chloralimine-N-sulfonic acid.

3. The water-soluble salts of chloralimine-N-sulfonic acid.

4. Sodium chloralimine-N-sulfonate.

5. The water-soluble salts of chloralimine-N-sulfonic acid and water-soluble organic bases.

6. Ammonium chloralimine-N-sulfonate.

JONAS KAMLET.

No references cited.